United States Patent
Niles

[15] 3,691,665
[45] Sept. 19, 1972

[54] FISHING POLE MOUNT
[72] Inventor: Burton M. Niles, Reedsport, Oreg.
[73] Assignee: Tackle and Gear, Inc., Reedsport, Oreg.
[22] Filed: April 1, 1971
[21] Appl. No.: 130,176

[52] U.S. Cl. ................................................43/15
[51] Int. Cl. ...........................................A01k 97/00
[58] Field of Search.........................................43/15

[56] References Cited

UNITED STATES PATENTS

| | | | |
|---|---|---|---|
| 765,433 | 7/1904 | Mangelsdorff | 43/15 |
| 2,551,996 | 5/1951 | Cherubini | 43/15 |
| 2,578,887 | 12/1951 | Jackson et al. | 43/15 |
| 3,007,275 | 11/1961 | Standley | 43/15 |

Primary Examiner—Samuel Koren
Assistant Examiner—Daniel J. Leach
Attorney—Clarence M. Crews

[57] ABSTRACT

A sturdy, inexpensive, fishing pole mount of extreme simplicity and dependability is provided which includes a supporting post adapted to be driven into the ground or otherwise fixed in a more or less upright position, a spring carried pole holder mounted on the post, and a spring trigger adapted when the carrier spring and the trigger spring are both put under strain and inter-engaged, to detain the holder in a cocked condition, the construction and arrangement being such that when the carrier spring is further stressed by a pull on the fishing line, the trigger is released and is carried by its spring away from the holding position. The carrier spring then springs free, causing a strike of mechanically limited magnitude to be effected through the holder.

7 Claims, 6 Drawing Figures

PATENTED SEP 19 1972 3,691,665
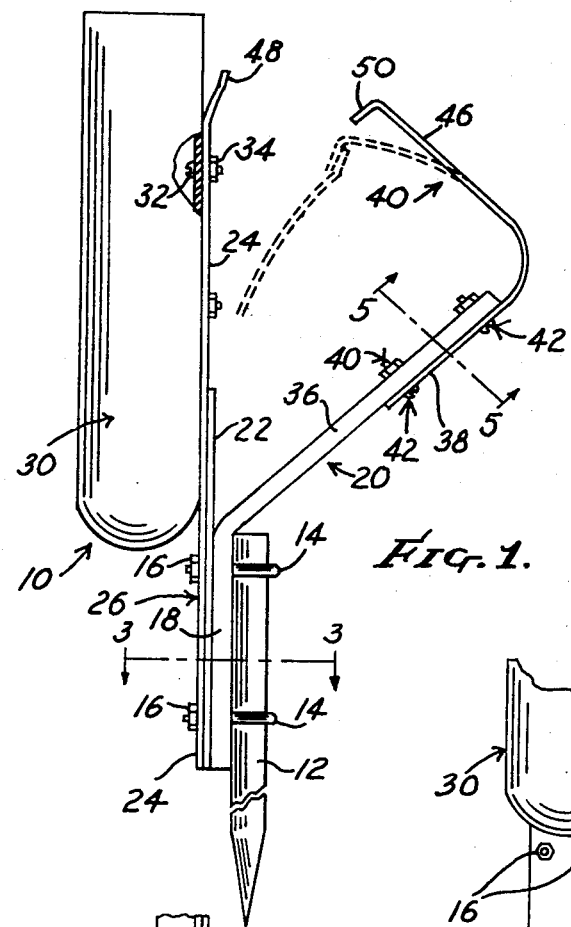
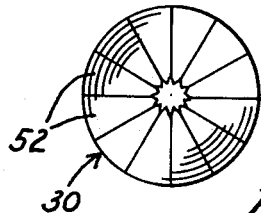
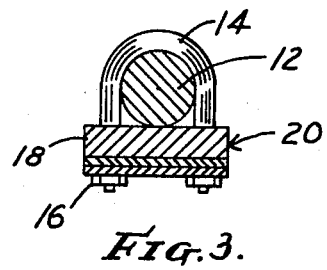
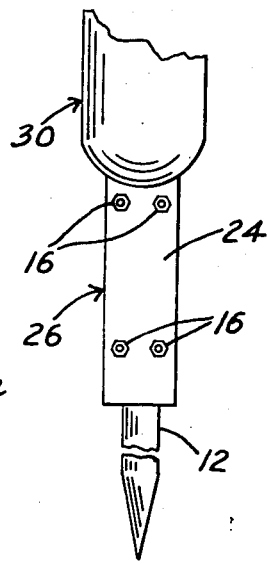
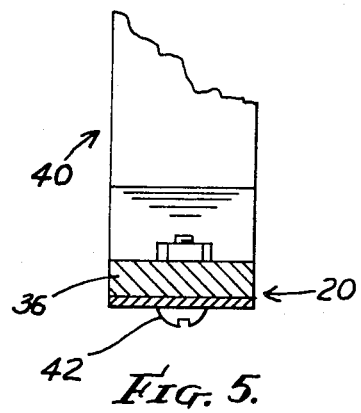
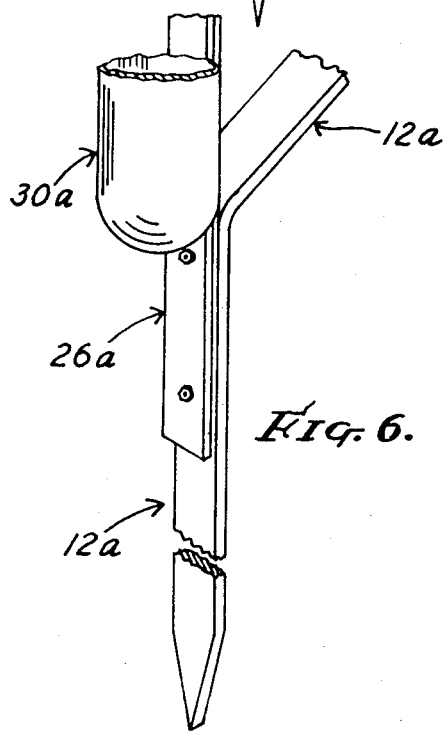
INVENTOR:
BURTON M. NILES
by *Clarence M. Crews*
HIS ATTORNEY

FISHING POLE MOUNT

This invention relates to fishing pole mounts of the kind adapted automatically to effect a strike of mechanically limited force in response to a tug upon the line.

Many fishing pole mounts of the kind broadly referred to have been devised. The object of the present invention is to provide a mount of this kind which is composed of few, simple and inexpensive parts, which can be assembled with very little labor expense, and which will be reliable and durable in use.

Other objects and advantages will hereinafter appear.

In the drawing forming part of this specification,

FIG. 1 is a view in side elevation of a fishing pole mount which embodies features of the invention and which forms a practical and advantageous embodiment thereof, the mount being shown in an upright attitude, the post portion of the mount being broken away intermediate its ends for compactness of illustration, and the relations and positions of the parts when set for fishing being indicated in broken lines;

FIG. 2 is a bottom plan view of the receptacle or cup in which the pole is set;

FIG. 3 is a sectional view taken on the line 3—3 of FIG. 1, looking in the direction of the arrows;

FIG. 4 is a fragmentary front view of a portion of the mount, showing how the post is united with the associated parts;

FIG. 5 is a sectional view taken on the line 5—5 of FIG. 1, looking in the direction of the arrows; and FIG. 6 is a fragmentary perspective view similar to FIG. 1 in which the post and the trigger spring carrier are made integral with one another but have the non-circular cross-section of the latter.

The illustrative mount 10 comprises a substantially rigid post or standard 12, desirably in the form of a steel rod measuring one-half inch in diameter, but tapered at its lower end for ease of penetration into the ground. At its upper end the post has secured to it, by means of U-shaped, threaded, through fasteners 14 and nuts 16, the lower arm 18 of a flat angle bar 20, and the leaves 22 and 24 of a carrier mounting spring 26. The legs of the fasteners embrace the post, pass through the lower or attaching leg 18 of the flat angle bar 20, then through inner and outer leaves 22 and 24 of the leaf spring 26. Nuts 16 are threaded onto the legs of fasteners 14, there being two upper nuts and two lower nuts.

The spring leaf 24 serves as the carrier for a metallic pole-receiving receptacle or cup 30, while the spring leaf 22 terminates considerably short of the point of attachment of the leaf 24 to the receptacle, and merely serves as a stiffener or reinforcement for the leaf 24. The upper end of the leaf 24 is secured at vertically aligned points to the receptacle 30 by bolt and nut combinations, the heads of the bolts 32 being disposed within the receptacle and the nuts 34 being threaded onto the shanks of the bolts and tightened to bear firmly against the back of the leaf 24.

The bar 20 is bent to form an angle (in the neighborhood of 135° as shown) so that the upper arm 36 of the bar extends upward at an angle in the neighborhood of 45° to the leaves 22 and 24 of the spring 26 in the unstressed condition of the spring. The magnitude of this angle is not at all critical so long as the other parts are harmoniously designed and proportioned to be operatively related to one another when the magnitude of the angle is taken into account.

The arm 36 has rigidly secured to its upper end a lower arm 38 of a detent spring 40. Such securement is effected through a pair of bolt and nut combinations 42, which lie in a common plane with the bolt and nut combinations 32, 34. Beyond the upper end of the arm 36, the detent spring 40 is caused to bend, when not under strain, through an angle of the order of 90° to provide an upper arm 46 which extends generally toward, but above the upper end of leaf 24 of the carrier spring 26.

The spring leaf 24 has a freely exposed tip 48. As shown, the tip 48 is caused to be freely exposed by inclining it away from the receptacle in a forward direction. The tip 48 may, through flexure of the spring 26 be forced forward to a position directly beneath an inturned retaining finger 50 of the spring arm 46. When the tip 48 has been thus displaced, the arm 46 may be bent downward to place the finger 50 behind the freely exposed tip 48 and in frictional contact therewith. The parts will retain this relationship securely so long as the spring 26 is not put under further strain.

With the post driven into the ground, or otherwise secured in a generally upright position, a pole lodged in the receptacle 30, and the parts 48 and 50 engaged as described, the fisherman may relax and wait for a strike to be made automatically in response to the taking of the bait.

The line will be made to extend forward from the pole (to the right as shown in FIG. 1), so that a tug upon the line puts the spring 26 under further strain, displacing the spring tip 48 briefly in a forward direction. This relieves the frictional hold of the tip 48 and the finger 50 upon one another, causing the finger 50 to snap clear of the tip 48. The full force of the spring 26 now acts to snap the pole carrier rearward for effecting a strike.

Although the spring 26 is quite a stiff spring, the long pole gives the line a pronounced mechanical advantage as compared with the short spring 26, so that the spring may be triggered by a relatively light tug and will exert a limited striking force, not calculated to tear the hook free.

The receptacle 30 is desirably made from a length of metallic tubing which is scalloped at its lower end to provide a series of identical blunt, tapering fingers 52, which fingers are then folded inward toward one another for effectually closing the lower end of the pole receptacle.

The structure of FIG. 6 is in all respects like that of FIG. 1, save that the post 12 and the trigger spring carrier of FIG. 1, save that the post 12 and the trigger spring carrier of FIG. 1, are combined into a single member 12a which has the rectangular cross-sectional shape of the carrier 20 of FIG. 1. The member 12a is pointed at its lower end for easy penetration into the ground. Since the structure of FIG. 6 is otherwise the same as that of FIG. 1, like reference numerals have been applied to corresponding parts with the postscript a added in each instance, and no further description will be given.

I have described what I believe to be the best embodiments of my invention. What I desire to cover by letters patent is set forth in the appended claims.

I claim:
1. A mount for a line and hook carrying fishing pole which includes, in combination,
   a. a rigid supporting post adapted to be fixed in a more or less upright position,
   b. a carrier leaf spring having a lower end portion thereof affixed to an upper end portion of said post and an upper end portion extending free of the post and terminating in a freely exposed tip portion,
   c. a pole receiving and confining receptacle disposed open end upward and affixed to the free portion of the carrier spring,
   d. an arm extending angularly forward from said post,
   e. a trigger spring affixed to the outer end of said arm and carried thereby, and extending in common with said arm in an upward and forward direction and thence bent generally rearward toward said carrier spring, and
   f. a downwardly extending retaining finger on the end of said trigger spring,
   said retaining finger engaging said freely exposed tip portion of the carrier spring when said carrier spring is bent toward said trigger spring and the trigger spring is bent toward the carrier spring to releasably retain the device in a cocked position, whereby a tug on the pole-carried line when the pole is held in the receptacle deforms the carrier spring to effect the release of the carrier spring from the trigger spring so that the carrier spring is returned to its normal upright position, thus jerking the line and setting the hook in the fish's mouth.

2. A fishing pole mount as set forth in claim 1 in which the carrier spring is secured in fixed relation to the receptacle through a single leaf which has a forwardly disposed tip portion.

3. A fishing pole mount as set forth in claim 1 in which the trigger spring supporting means comprises a rigid angle bar having a lower arm which extends, in common with the carrier spring, in the direction of the post, and an upper arm which diverges at a substantial acute angle in a forward direction from the carrier spring, the lower arm of the angle bar and the lower end of the carrier spring being affixed to the post by common affixing means.

4. A fishing pole mount as set forth in claim 1 in which the carrier spring consists of a plurality of juxtaposed leaves, one of which is long and is firmly affixed at a plurality of points to the receptacle, the shorter of said leaves being disposed adjacent the long leaf in position to stiffen and reinforce the long leaf.

5. A fishing pole mount as set forth in claim 1 in which the receptacle consists of a metallic tube scalloped at the lower end to provide blunt, tapering fingers, which fingers are displaced inward to effectually close the lower end of the tube for pole supporting purposes.

6. A fishing pole mount as set forth in claim 1 in which the post is of circular cross-section so that the erected mount can be reoriented without withdrawing it from the ground.

7. A fishing pole mount as set forth in claim 1 in which the post is of non-circular cross-section, and the upper end of the post diverges sharply from the carrier spring to form the trigger spring carrying arm as an integral extension thereof.

* * * * *